Oct. 11, 1966  E. H. ZINER  3,277,943
TIRE TRACTION LUG UNIT
Filed Oct. 5, 1964

INVENTOR
EDWARD H. ZINER by Walter S. Paul
ATTORNEY

United States Patent Office 3,277,943
Patented Oct. 11, 1966

3,277,943
TIRE TRACTION LUG UNIT
Edward H. Ziner, Upper Marlboro, Md.
Filed Oct. 5, 1964, Ser. No. 401,607
2 Claims. (Cl. 152—236)

This invention relates to traction lug units, and means for mounting each unit independently on a tire.

The main object is to provide tire lug units one or more of which may be readily installed in spaced relation on a tire without jacking up the vehicle or using any special tools.

Another object is to provide permanently installed attachment fittings at spaced intervals on the rims of the wheels, to which the tire lug units may be easily attached when desired, and from which they may be just as easily detached after they have served their purpose and are not needed any longer.

Figure 1:
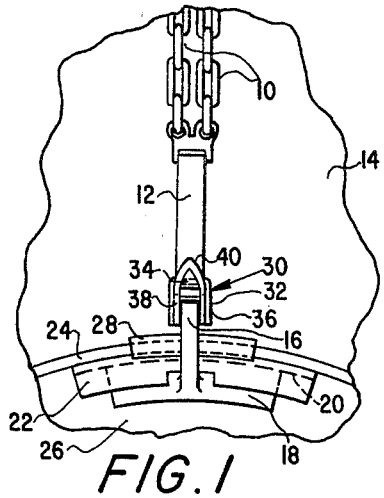
Figure 3:
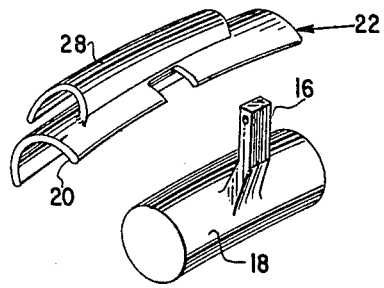
Figure 2:
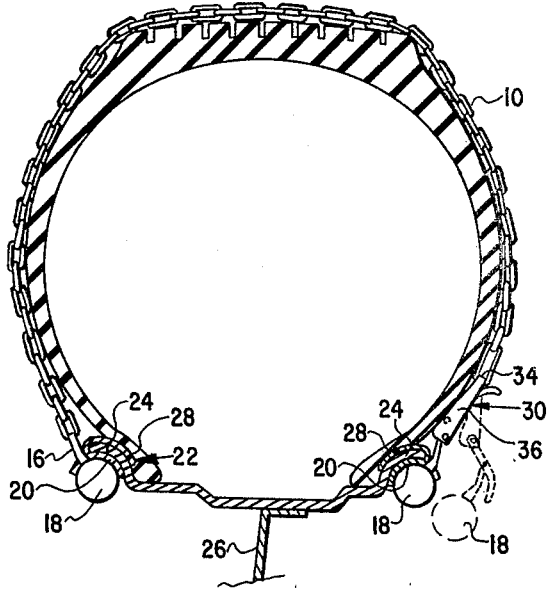
Figure 4:
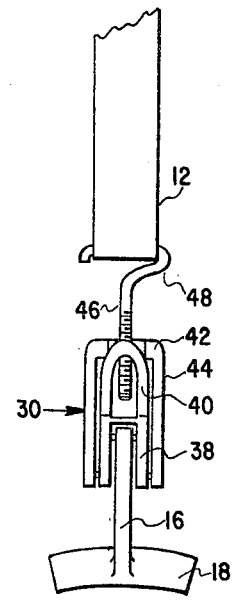

Other and more specific objects will appear in the following detailed description of a preferred form of the invention, as illustrated in the accompanying drawing, wherein:

FIG. 1 is an elevational view of the outer end of a tire lug unit as attached to the rim of a wheel on which the tire is mounted, FIG. 2 is a sectional view of the tire and rim on which a tire lug unit is mounted, FIG. 3 is a perspective view of an attachment fitting for permanent mounting on a tire rim and an end link of a tire lug unit adapted for interlocking with said attachment fitting, and FIG. 4 is an elevational view of the outer end of another modification of tire lug unit made in accordance with the present invention.

The present invention comprises a traction tire lug unit which is simple, reliable and easy to install in emergencies without the use of special tools and without the necessity of jacking up the wheels on which one or more units may be installed.

In its simplest form it may consist of one or more flexible tire lugs such as the chains 10 stretched over the tire 14 and having an elastic link 12 on at least one side of the tire, and a T-headed link 16 connected to the ends of the flexible tire lugs on each side of the tire, the heads 18 of which are hung over a slotted groove 20 in an attachment fitting 22 permanently mounted on the rim 24 on each side of the wheel 26. The mounting shown in the drawings is by way of a steel clip 28 on the attachment fitting 22 which may be hammered over the rim under the base of the tire carcass and forms a strong joint that cannot be readily pulled off by any peripheral forces across the side of the tire that might be caused by traction stresses on the flexible tire lugs. The curvature of the clip to conform to the curvature along the circumference of the rim portion to which it is attached adds to the strength of the joint. Obviously, other ways of simple attachment may be used, such as screws, rivets, etc.

The groove 20 in the attachment fitting is arcuate, conforming to the curvature of the rim 24, and the head 18 on the headed link 16 is shown to be correspondingly arcuate, but this groove and head may be of any other nesting forms such as ball and socket or hook and ring, etc. The groove may be provided with a slot to permit a substantially straight shank to be extended therethrough from the head 18 for linking to the corresponding end of the tire lugs.

The shanks of the headed links may be made of two parts having an axial screw-thread connection for adjustment of the overall length of the flexible tire lugs to adapt them to different size tires in a certain range within the limits of said adjustment.

In order to be able to stretch the tire lugs more firmly, a toggle lock linkage 30 may be connected between the shank and the corresponding end of the flexible tire lug for use on the outer side of the tire.

This linkage comprises a U-shaped outer member 32 having parallel substantially triangular plate legs 36 extending from the cross bar 34 at the base of the U, which joins their corresponding triangular apexes. The cross bar is connected to the end of the tire lugs, and the corresponding side edges of the triangular shaped legs are adapted to rest against the side of the tire during installation of the tire lug unit. The outer corners of the triangular legs 36 are pivotally connected to the outer ends of the legs 38 of a narrower U-shaped link for swivelling its base inside the triangular legs. The end of the shank of the headed link 16 is pivotally connected between the base of the legs of the narrower U-shaped link. The narrower U-shaped link has a handle 40 extending from its base portion, whereby the tire lugs may be drawn tightly over the tire after the heads of both headed links have been placed in engagement with the grooves in their respective attachment fittings, by swinging the narrower U-shaped link over into the space between the triangular legs by means of the handle 40, until the pivot at the end of the shank of the headed link 16 is swung past dead center over the pivots at the ends of the triangular legs 36 to lock the toggle linkage and the tire lugs firmly in place.

The tire lugs may be easily dismounted by pulling lever 40 out to swing the narrower U-shaped link past its dead center position to unlock the toggle linkage and release the head of the headed link 16 on the outer side of the tire from its groove, and the head at the other end of the tire lugs may then be removed from its groove to release the tire lugs entirely.

The adjustment of the over-all length of the tire lugs may be obtained by an axial screw connection between a screw threaded bore in the cross bar 42 at the base of the U-shaped member 44, and a correspondingly threaded shank 46 on the hook link 48 which is connected to an elastic band 12 linked to the tire lugs.

Many obvious modifications in the form and details of the several elements comprising the invention as illustrated may be made without departing from the spirit and scope of the present invention as defined in the appended claims.

What is claimed is:
1. In combination with a flexible traction lug for stretching across the tread of a tire on a wheel,
    a T-headed link attached to each end of said traction lug at opposite sides of the tire, and
    a grooved attachment adapted for permanent mount- ing on the rim on each side of the wheel and having a slotted groove for receiving said T-head of the headed link on the corresponding side of the wheel to hold the traction lug firmly stretched over the tire, said grooved attachment having a curvature substantially conforming to the groove in said wheel rim and a clip extending from the back of said attachment adapted for springing over the edge of said rim to fix the attachment firmly thereon with its slotted portion extending outwardly from the rim groove for passing the shank portion of said T-headed link through the slot in said slotted portion when the head of the headed link is received in the groove of said attachment the top of the T-head on said link being a substantially cylindrical cross bar forming a bearing in said slotted groove to provide free pivotal movement of the link in a plane normal to the wheel and to restrict its pivotal movement in a plane parallel thereto.

2. A combination of a T-headed link and grooved attachment as defined in claim 1, said clip extending from the back of said grooved attachment being made of spring steel and formed to fit snugly over the curvature of the rim so as to provide maximum frictional resistance against removal or loosening of the grooved attachment therefrom.

References Cited by the Examiner
UNITED STATES PATENTS

| | | | |
|---|---|---|---|
| 2,514,243 | 7/1950 | Iandiorio | 152—222 |
| 2,647,551 | 8/1953 | Richards | 152—236 |
| 2,777,499 | 1/1957 | Erving | 152—233 X |
| 2,915,101 | 12/1959 | Kratz | 152—222 |
| 2,987,092 | 6/1961 | Marcanello | 152—233 |
| 3,095,919 | 7/1963 | Yohe | 152—236 |
| 3,165,137 | 1/1965 | Burgen | 152—236 |

ARTHUR L. LA POINT, *Primary Examiner.*

C. HAEFELE, *Assistant Examiner.*